Jan. 24, 1961 E. B. MASON ET AL 2,969,268

CABINET

Original Filed Nov. 23, 1954 3 Sheets-Sheet 1

INVENTORS.
Emerson B. Mason
Anthony C. DeNapoli, Jr.,
By Mueller and Aichele Atty's.

INVENTORS.
Emerson B. Mason,
Anthony C. DeNapoli, Jr.,
By Mueller and Aichele Atty's.

INVENTORS.
Emerson B. Mason
Anthony C. DeNapoli, Jr.,
By Mueller and Aichele Attys.

United States Patent Office 2,969,268
Patented Jan. 24, 1961

2,969,268

CABINET

Emerson B. Mason, Western Springs, and Anthony C. De Napoli, Jr., Mount Prospect, Ill., assignors to Motorola, Inc., Chicago, Ill., a corporation of Illinois Continuation of application Ser. No. 470,604, Nov. 23, 1954. This application Jan. 8, 1959, Ser. No. 785,998

19 Claims. (Cl. 312—7)

This invention relates generally to cabinet housings and more particularly to an improved thin panel knock-down cabinet assembly for television receivers or similar electrical equipment. This application is a continuation of application Serial No. 470,604, filed November 23, 1954, now abandoned.

It is well known that present day cabinets for television receivers and similar electrical apparatus must be of considerable size and at the same time be of sturdy construction to house properly such bulky and heavy equipment. Therefore, it is apparent that storage and shipment of these cabinets prior to the time equipment is installed therein becomes a problem for manufacturers of the equipment. A solution is indicated in the form of a knock-down cabinet, or one which may be handled as a compact group of standard component parts until the time of use as a cabinet, at which time the housing may be assembled. However, such a cabinet must be capable of expedient assembly and the over-all cost of assembling and handling should preferably be less than the corresponding costs of cabinets which are directly assembled. Furthermore, it is necessary that such a knock-down cabinet be of such construction that when assembled, it forms a sturdy housing and one which is attractive in appearance so as to meet the aesthetic requirements of such housings.

Accordingly, it is an object of the present invention to provide an improved cabinet structure which may be shipped and stored in disassembled form prior to use so as to require but a minimum of space.

Another object of the invention is to provide an improved knock-down cabinet structure which may be assembled through simple fastening operations by workers with but little skill and with but few tools.

A further object of the invention is to provide an inexpensive cabinet structure for television receivers or the like, the parts of which may be formed from inexpensive stock material which need not meet close dimensional tolerances, and which when assembled provide a sturdy housing.

Still another object of the invention is to provide an improved knock-down television cabinet structure utilizing prefinished material which when assembled provides an attractive cabinet.

A still further object of the invention is to provide a knock-down television cabinet which may be assembled by operating substantially entirely from within the structure so as to minimize the possibility of damage or marring at such time.

A feature of the invention is the provision of a cabinet structure utilizing corner clamping members to secure adjacent enclosing panels in fixed relation to provide a rigid assembly thereof.

A further feature of the invention is the provision of clamping members for a knock-down television receiver cabinet which include an outer corner member overlying adjacent enclosing panels and an inner clamping member to press the panels in fixed position against the corner member. The inner member may be secured entirely from within the cabinet so that the screws or other fastener means are hidden and also to lessen the possibility of damage to the cabinet during assembly.

Another feature of the invention is the provision of a knock-down television cabinet structure with thin flat panel walls secured by corner clamping members and further strengthened and held against bowing by a front frame having a channel therein to receive the panels and connected to the picture tube mask and protective glass. The flat panels have no glue blocks or other projections so the panels may be transported and stored in a minimum of space.

Still another feature of the invention is the provision of such a cabinet structure wherein spring-type inner clamping members are used so that they may be snapped into place and apply resilient pressure to panels to hold the same in assembled condition, thereby simplifying and expediting assembly.

A still further feature of the invention is the provision of such a knock-down cabinet structure in which bottom struts extend between certain corner clamping members to form supports for a television receiver chassis contained within the cabinet.

Further objects, features and the attending advantages thereof will be apparent upon consideration of the following description when taken in conjunction with the accompanying drawings in which.

Figures 1, 2, 3, 4, 5:
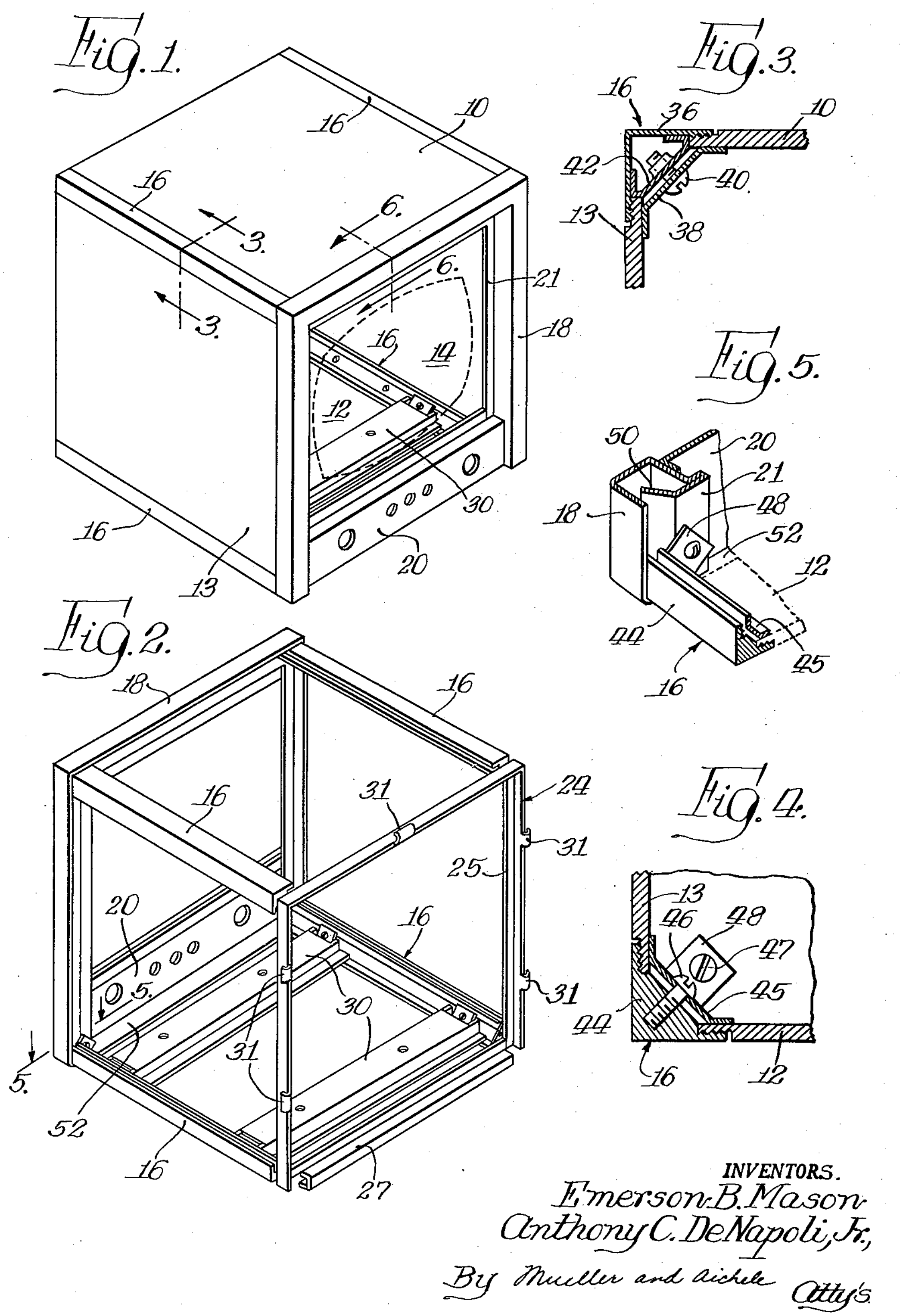
Fig. 1 is a perspective view of a television cabinet constructed in accordance with the present invention.
Fig. 2 is a perspective view of the back of the frame of the cabinet of Fig. 1.
Fig. 3 is a sectional view along the line 3—3 of Fig. 1 showing the corner detail.
Fig. 4 illustrates a second embodiment of the corner detail of Fig. 3.
Fig. 5 is an enlarged cut away view of a corner of the cabinet frame of Fig. 2, along the line 5—5.

In accordance with the invention there is provided a cabinet structure especially adapted for television receivers which structure may be handled as a compact group of component parts and then easily assembled. Comparatively flat thin panel members serve to enclose the cabinet, and they are maintained in fixed relation by corner clamping members at the junctions of adjacent panels. The clamping members include an outer member with gripping sections overlying edge portions of adjacent panels and an inner clamping member to engage panels and retain them firmly against the outer member. In order to insure tenacous retention of a panel, the inner and outer members and/or the panel may be shaped to provide interlocking action. The inner member may be directly secured to the outer member, e.g. by screws, or the inner member may be resilient and secures the panel and the outer member through frictional engagement in corresponding grooves in these parts.

The cabinet also includes a front frame structure secured to the corner members and having a channel groove or support ledge therein, and may include an inwardly slanted retainer projection to retain panels held in the groove and prevent bowing thereof. A rear frame may be provided to support a back enclosing panel which further strengthens the structure, or a back panel may be directly connected to the panels and corner structure to enclose and strengthen the cabinet. The cabinet bottom structure may be formed by a plate which supports the chassis of the housed apparatus, or may be a panel secured to the side panels by corner structures with struts extending across the bottom of the cabinet to support the apparatus.

The cabinet will now be described in the form of a television receiver housing, but it will be apparent that the structure employed may be utilized for different types of equipment. The cabinet of Fig. 1 includes a top panel 10, a bottom panel 12 and side panels 13 and 14. These panels may be formed of any suitable sheet material such as fiber board, plywood, plastic or metal. Corner clamping structures 16 are employed at the juncture of these various panels in order to secure them in fixed relation. A four-sided front frame 18 is also provided with the control panel 20 forming the bottom side of the frame 18. A flange 21 extends around the interior of the front frame and may be used to support protective glass and a mask for the television picture tube.

Fig. 2 is a perspective view of the rear of the cabinet frame of Fig. 1 without any of the enclosing panels. In this view it may be seen that a rear frame 24 is secured to the clamping members and that this frame has an angle shaped cross-section thus providing a flange 25 which may secure a rear panel. Rear frame 24 also includes a channel member 27 extending along the lower side thereof, and this channel may be used to support the bottom panel 12. A pair of support struts 30 extend between the bottom pair of corner clamping members 16 and are used to support a chassis within the cabinet. A series of lugs 31 around frame 24 are employed to engage the top and side panels to hold the same intermediate the corners to prevent the panels from bowing.

Fig. 3 is a sectional view of the corner clamping member 16, and it may be seen to consist of an outer member 36 with sections thereof overlying portions of the top panel 10 and the side panel 13 with serrations or teeth in such sections in order to engage corresponding teeth in the panel. The panel may be rabbeted so that the corners are flush to present a neat appearance. An inner clamping member 38 is then secured to the outer member 36 by means of a suitable fastener 40 which engages a supporting strip 42 secured between the sides of outer member 36 by brazing or welding. Therefore, it may be seen that the panels are sandwiched or clamped between the inner and outer members in such a way as to resist any tendency for pulling apart. In this manner the top, side and bottom panels are secured to one another. The clamping member may be formed of some suitable metal and the outside of member 36 becomes a trim strip of the completed cabinet.

Fig. 4 shows a cross-sectional view of an alternate construction for the corner members 16 which may be seen to be similar to Fig. 3 except that the outer member 44 is a solid one-piece member rather than a hollow two-piece member. This form of the outer member is shown merely by way of an example of a modification of the invention, and it is apparent that the two constructions are interchangeable. The sectional view of Fig. 4 also illustrates an inner member or flange 45 which is secured to the outer member 44 by the self-tapping screw 46. The flange 45 may include bent up end brackets 48 secured by screws 47 to the front or back structure of the cabinet.

The cut-away view of Fig. 5 shows a portion of front frame 18 and the fastening of the corner member 16 thereto by means of an angle bracket 48 which is bent up from the inner clamping member 45. Similar angle brackets may be used at the other corners for securing the front frame 18 and back frame 25. It may be seen that frame 18 has a U-shaped cross-section with a flange portion 21 extending therefrom and with an inwardly slanted retainer projection 50 extending at an angle within the U-shaped frame as a catch for the panel. Thus a panel supported by the corner clamping member 16 may also be held in the channel groove of the U-shaped frame and be secured against the outer side of the frame by the projection 50. Control panel 20 may be secured to the front frame 18 by any suitable means such as welding or screws, and has a lower right-angled section 52 which aids in the support of the bottom panel 12.

Figures 6, 7:
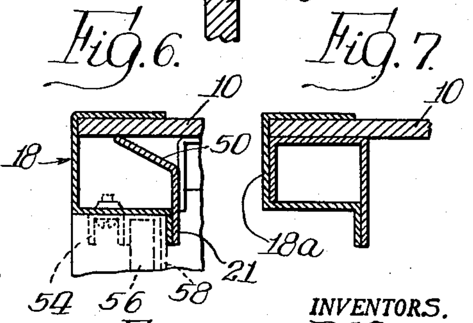
Fig. 6 is a sectional view along the line 6—6 of Fig. 1.
Fig. 7 is a sectional view of an alternate construction of the frame shown in Fig. 6.

The top and side sections of the front frame 18 may be of the same construction as is apparent from consideration of the cross-sectional view of the top of frame 18 in Fig. 6. It may be seen that angle projection 50 tends to maintain the top panel 10 within the channel provided by the frame 18 which at the same time taking up for any tolerances of the panel thickness so that the panel is held against rattling or bowing. Fig. 6 also shows a U-shaped strip 54 which is secured to the frame 18 in order to clamp the protective glass 56 and the picture tube mask 58 against flange 21. It is also possible to alter the construction of the frame 18 as is shown by frame 18*a* in Fig. 7. In this alternative construction the section 50 of Fig. 6 has been extended in a direction parallel to the top panel 10 and at a distance equal to the thickness of the panel 10 from the outer portion of the frame 18*a* so as to provide a channel or support ledge affording maximum support for this panel.

Figure 8:
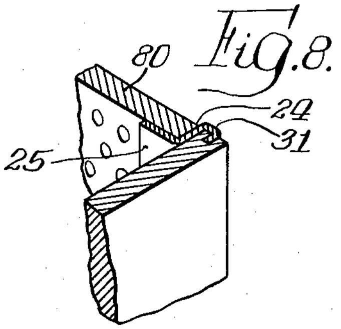
Fig. 8 is a detail view of the back panel fastening.

Fig. 8 shows in detail the method of attaching the panels 12, 13 and 14 to the back frame 24. It may be seen that the small lugs 31 are set into the edges of the various panels to prevent bowing thereof and that the ledge 25 forms a convenient fastening for the back panel 80.

Figure 9:
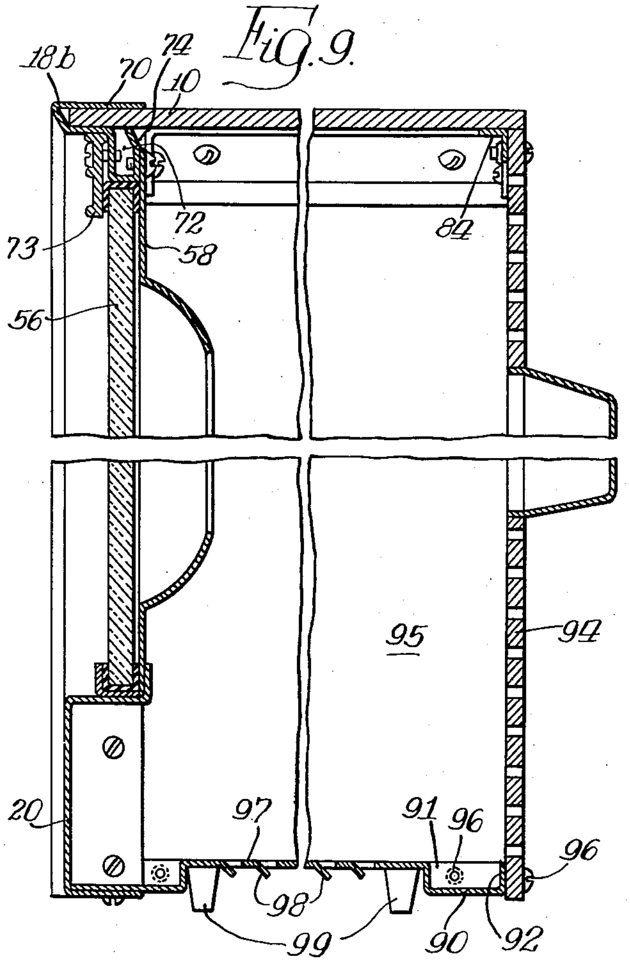
Fig. 9 is a sectional view of an alternate construction of the cabinet of Fig. 1.
Figure 10:
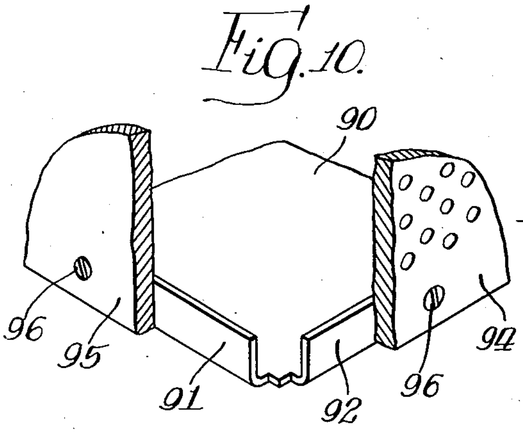
Fig. 10 is a cut away view of an alternate construction of the bottom panel of the cabinet.

Figs. 9 and 10 show another embodiment of the cabinet including a modification of the structure of the front frame and a different bottom construction. In this version it may be seen that the cross-section of the frame consists of a pair of perpendicular channel sections formed from a single strip of flat material. A first channel 70 supports the top panel 10 and a second channel 72 forms a flange to which the picture tube mask 58 and the glass retaining member 73 are secured to clamp the protective glass 56.

A retainer section 74 is also provided in order to maintain panel 10 within the channel 70. A front frame of this type is advantageous in that it may be formed of a single strip of material without the necessity of welding or brazing the section 21 (Fig. 6) to the frame in order to form the flange 50. In the version shown in Fig. 9 the mask of the picture tube cooperates with the retainer section 74, not only to retain the protective glass 56 but also to strengthen the front frame 18*b* at the corners since the mask may be secured to such frame at adjacent sides thereof. Actually the mask may form the sole supporting means for the sides of the front frame to eliminate other securing thereof. The back frame is eliminated in this embodiment and the back panel 94 is secured to the corner structures as by bracket 48 in Fig. 4. Additional securing brackets 84 may be provided for interconnecting the back panel with the top and side panels intermediate the corners of the cabinet.

In order to render the structure less expensive, a metal bottom plate 90 may be used instead of a panel secured by corner members with supporting struts secured thereto. The plate 90 has upturned sides such as 91 and 92, forming flanges to which the back panel 94 and the side panels 95 may be secured by screws 96. Such an arrangement would provide retention of the lower portions of the enclosing panels as well as an enclosure for the bottom, all by means of the single panel 90, and also serves as a support for the chassis. The placing of outside screws at the bottom edge of the panel is not objectionable as they are not easily seen. The plate may have a raised portion 97 for supporting a chassis with louvers 98 therein for providing ventilation. The chassis may be assembled and tested on the bottom plate prior to the assembling of the enclosing panels therewith. Legs 99 may be secured to the bottom plate 90 for supporting the cabinet and apparatus therein.

Additional modifications for securing the panels together by the use of corner members are shown in Figs. 11–16 inclusive. It is to be pointed out that these corner constructions can be used when the panels extend at other angles than 90° as shown.

Figure 11:
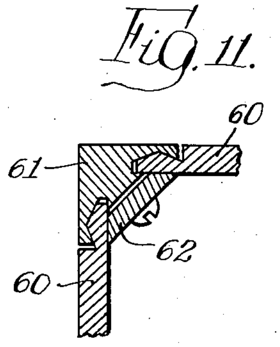
Figs. 11–16 are sectional views of an alternate construction of the corner details of the cabinet.

In Fig. 11, panels 60 are secured by a corner structure including outer member 61 and inner member 62. The outer member 61 and the panels 60 have slanting interlocking configurations so that when the inner member is secured against the panels, secure connection of the panels is provided. As illustrated the surface of the outer member 61 is flush with the surfaces of the panels 60.

Figure 12:
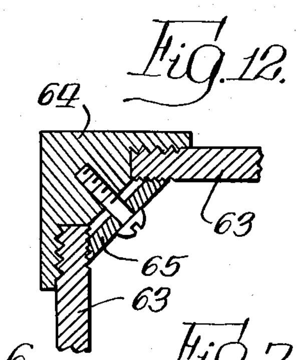

Fig. 12 illustrates a modification of the corner clamping member in which the panels 63 are not rabbeted and the outer member 64 is therefore not flush with panels. Furthermore, the inner member 65 is a straight member, the angular ends of which press panels 63 into secure engagement with the outer member. The panels 63 and both the inner member 65 and outer member 64 are serrated to provide secure interlocking action.

Figure 13:
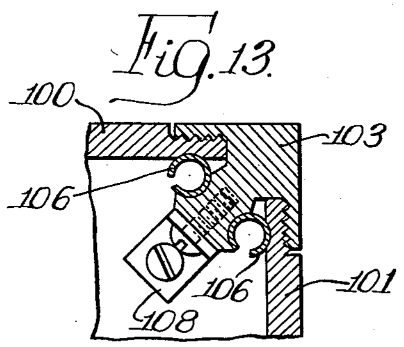

Fig. 13 shows a pair of panels 100 and 101 clamped against serrated portions of outer member 103 by a pair of split tubular members 106. A portion of outer member 103 extends within the cabinet and between the panels 100 and 101 as an inward projection so that the tubular members 106 may be forced into opposing arcuate portions or grooves cut from this projection of the outer member and from portions of the panels in order to provide the clamping action against the outer member 103. Therefore, it may be seen that the assembling operation will be simplified since it is merely necessary to force the split tubular members 106, which have a certain amount of resilience, into the previously formed arcuate portions. Angle brackets such as bracket 108 may be used at the corners of the clamping structure in order to secure the same to the front and rear frames.

Figure 14:
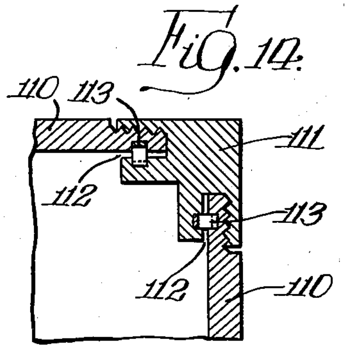
Figure 16:
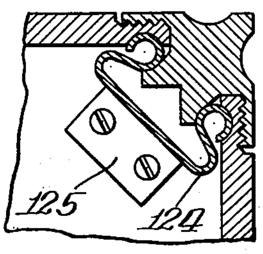
Figure 17:
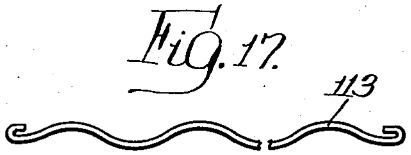
Figs. 17 and 18 illustrate resilient securing members employed in the structure of Fig. 14.
Figure 18:

The corner construction illustrated in Fig. 14 utilizes resilient securing members 112 of a different construction, such as illustrated in Figs. 17 and 18, in order to retain panels 110 in engagement with the outer member 111. It may be seen that there is in effect a pair of perpendicular channels 113 in the outer member 111 into which portions of the panels 110 are inserted. Oppositely positioned seating notches or grooves in each panel and in the sides of channels 113 are utilized to retain the resilient securing members 112. These members may be in the form of resilient spring strips, or strips having lateral displacements along the axis, as illustrated, and may be installed by pulling them through their respective seating notches while the cabinet components are maintained in position by means of a suitable jig. By utilizing this form of corner clamping device, or the type illustrated in Figs. 13 to 16, it is possible to do away with the bolts or screws necessary with the type illustrated in Figs. 3, 4, 11 and 12.

Figure 15:
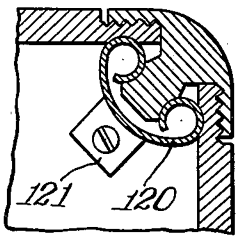

The resilient inner members of Figs. 15 and 16 are similar to those shown in Fig. 13 except that in these versions the members are integral and formed from a single strip of resilient material by rolling the two edges thereof. The resilient member 120 shown in Fig. 15 may then have an integral flange 121 at the end thereof which is used to secure the front frame thereto. The resilient member 124 of Fig. 16 also shows an angle bracket 125 for the same purpose.

Figure 19:
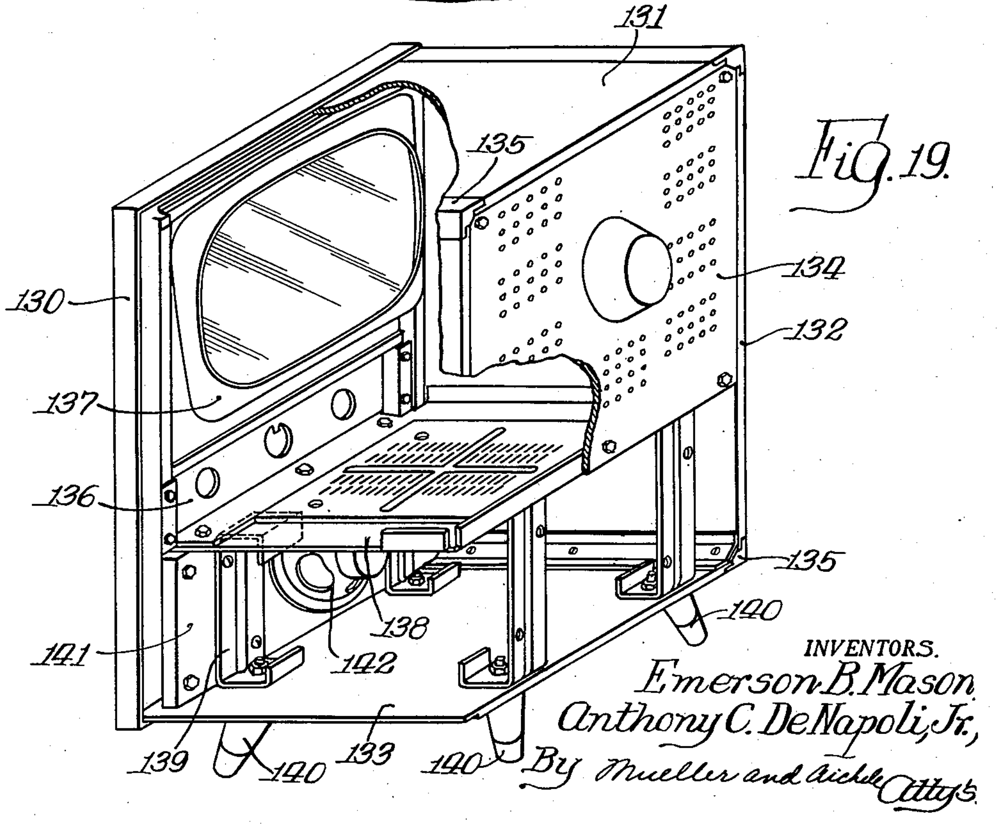
Fig. 19 illustrates a console television cabinet in accordance with the invention.

In Fig. 19 there is illustrated a console television cabinet of knock-down construction in accordance with the invention. In this structure the front frame 130 extends all the way from the top to the bottom of the cabinet. Top panels 131, side panels 132 and bottom panel 133 are all interconnected by corner structures 135 which may be in accordance with any of the various embodiments illustrated. A back panel 134 is provided which may be secured to the remaining parts of the cabinet in a manner previously described. A control panel 136 and a mask structure 137 may be provided as has been previously illustrated. In this construction a chassis supporting plate 138 is supported on brackets 139 secured through the bottom panel 133 to supporting legs 140. Accordingly, the weight of the chassis is supported through the brackets 139 directly by the legs 140 and the bottom panel need not be sufficiently strong to support the chassis. A baffle plate 141 is provided for a loud speaker 142, which baffle plate may be secured to the flange of the front panel 130.

It will be obvious that the console construction of Fig. 19 may be modified in accordance with various other constructions illustrated in the application. The bottom plate 133 may have upturned edges for securing the same to the side and back panels to thereby eliminate the bottom corner structures 135. Also the loudspeaker baffle 141 may be constructed of a sufficiently strong material to eliminate the front brackets 139 if this is desired.

It is apparent that the described cabinet structure is composed of parts which may all be produced in finished form and handled and stored conveniently prior to assembly for housing of electrical equipment. Furthermore, the design is such that many of the fastening operations will be carried on from within the cabinet structure so as to minimize the possibility of marring the exterior of the cabinet, but yet the components need not be constructed to particularly close tolerances since the panel edges are all contained within comparatively wide slots and only a minimum of fitting of the cabinet framework is necessary.

The invention provides, therefore, a knock-down cabinet structure for television equipment or the like which may be assembled at a point of use to form a sturdy yet attractive cabinet housing.

We claim:

1. A housing structure for enclosing a television receiver including in combination, a unitary four-sided front frame with a channel groove having a retainer projection in at least three of the sides thereof, a plurality of at least three rectangular enclosing panels having ends disposed in said channel groove and retained by said projection, a back frame, a plurality of corner clamping means secured to said front frame and said back frame, said clamping means each including an elongated outer corner member with serrated sections overlying and contacting portions of two adjacent panels and an elongated inner clamping member in fixed relation with said outer corner member and engaging at least one of said panels to clamp the same directly against a serrated section of said outer member, and a strut member extending between a pair of corner clamping means for supporting an article to be housed within said structure.

2. A housing structure for enclosing a television receiver including in combination, a unitary four-sided front frame with a channel groove having an inwardly slanted projection in at least three of the sides thereof, said frame defining a screen-viewing opening with flange portions thereabout for supporting a television receiver component a plurality of at least three rectangular enclosing panels having ends disposed in said channel groove and retained by said projection, a plurality of corner clamping means secured to said front frame for fastening adjacent panels to one another, said clamping means including an outer member with serrated sections overlying and contacting portions of two adjacent panels and an inner clamping member in fixed relation with said outer member and engaging by direct contact at least one of said panels to clamp the same directly against a serrated section of said outer member.

3. A housing structure for a television receiver including in combination, a rectangular front frame defining a screen viewing opening and having integral top and side portions with support grooves therein, a retainer projection in said support groove, top and side enclosing panels of compressible fibrous material having ends disposed in said support groove and retained by said projection, a pair of corner clamping means secured to said front frame for fastening said top panel to said side panels, said clamping means including an outer member with serrated sections overlying and contacting portions of the adjacent panels and an inner clamping member in fixed relation with said outer member and engaging said panels directly opposite said serrated sections to clamp the same against said serrated sections of said outer member, a bottom plate for supporting articles to be housed and including edge portions secured to said front frame and to said side panels, and a back panel for said housing structure secured to said corner clamping means and to said bottom plate.

4. A cabinet for enclosing a television receiver including in combination, a unitary four-sided front frame with the sides having a channel groove, a plurality of enclosing panels with edges disposed in said channel groove, and clamping means securing adjacent panels to one another, said clamping means including an outer corner member with extended serrated sections overlying and contacting portions of two enclosing panels at a corner of said cabinet, and an inner clamping strip fastened to said outer member and having opposite edges engaging said two enclosing panels directly opposite said serrated sections for pressing said portions of said two enclosing panels into fixed relation against said extended serrated sections of said outer member.

5. A housing structure for a television receiver including in combination, a bottom structure for supporting receiver components and including edge portions, a front structure including a mask having a screw viewing opening and a frame having integral top and side portions with support grooves therein, top and side enclosing panels of fibrous material having edges supported in said support grooves, said front structure and said side panels being secured to said edge portions of said bottom structure, a pair of corner clamping means secured to said frame of said front structure for fastening said top panel to said side panels, said clamping means including an outer member with clamping sections overlying and contacting edges of the adjacent panels and an inner clamping member in fixed relation with said outer member and having clamping sections engaging said edges of said panels directly opposite said clamping sections of said outer member, said edges of said panels and said clamping sections of one of said members engaging the same having configurations to provide locking action therebetween, and a back panel for the housing structure secured to said corner clamping means and to said bottom structure.

6. A housing structure for a television receiver including in combination, a bottom structure for supporting receiver components and including edge portions, a front structure including a mask portion having a screen viewing opening and a frame portion having integral top and side sections with support grooves therein, top and side enclosing panels of fibrous material having edges supported in said support grooves, a pair of corner clamping means secured to said frame portion for fastening said top panel to said side panels, each of said clamping means including an outer member with clamping sections overlying and contacting edge portions of the adjacent panels and inner clamping means in fixed relation with said outer member and having clamping portions engaging said panels directly opposite said clamping sections of said outer member, said edge portions of said panels being recessed to receive said clamping sections of said outer member whereby a substantially flush outer surface is provided, said recessed edge portions of said panels and said clamping sections of said outer members having configurations to provide locking action therebetween, said front frame structure and said side panels being secured to said edge portions of said bottom structure, and a back panel for the housing structure secured to said corner clamping means and to said bottom structure.

7. A housing structure for a television receiver including in combination, a unitary front structure defining a screen viewing opening and having top and side frame portions with support grooves therein, top and side enclosing panels of fibrous material having ends supported in said support grooves, a pair of corner clamping means for fastening said top panel to said side panels, said clamping means each including an outer member with clamping sections overlying and contacting edge portions of the adjacent panels and an inner clamping member in fixed relation with said outer member and having clamping sections engaging said panels directly opposite said clamping sections of said outer member, said edge portions of said panels having recesses therein with slanting surfaces and said clamping sections having slanting surfaces engaging said slanting surfaces of said recesses to provide locking action therebetween, a bottom structure including edge portions secured to said front structure and to said side panels, and a back panel for the housing structure secured to said corner clamping means and to said bottom structure.

8. A cabinet structure including in combination, an integral front frame structure with a top portion and a side portion each having a channel groove therein, a plurality of enclosing panels with edges disposed in said channel grooves, and clamping means securing adjacent panels to one another, said clamping means including an outer corner member with extended sections overlying and contacting edge portions of two enclosing panels at a corner of said cabinet, and inner clamping means fastened to said outer member and having opposite portions engaging said two enclosing panels directly opposite said extended sections for pressing said edge portions of said two enclosing panels into fixed relation against said extended sections of said outer member, said extended sections of said outer member and said edge portions of said enclosing panels having complementary shaped surfaces to provide locking action therebetween.

9. A cabinet for enclosing a television receiver including in combination, a unitary four-sided front frame with a channel groove in the sides thereof, a plurality of enclosing panels with edges disposed in said channel groove, and clamping means securing adjacent panels to one another, said clamping means including an outer member with serrated sections overlying edge portions of two enclosing panels at a juncture thereof, said outer member having an inward projection extending between said two enclosing panels, said projection having grooves on each side thereof, and a pair of resilient slotted tubular members, one directly engaging each of said two enclosing panels directly opposite said serrated sections and a groove of said inward projection for retaining said edge portions of said two enclosing panels in engagement with said serrated sections of said outer member.

10. In a knock-down cabinet assembly which includes enclosing panels having grooves along the edge portions thereof, the corner clamping device for securing the edge portions of adjacent panels including in combination, an elongated outer member having serrated sections overlying the edge portions of the panels opposite said grooves, and said outer member having an inwardly projecting portion extending between the panels with grooves extending along the sides thereof, and a pair of resilient slotted tubular members engaging the grooves of the edge portions of the panels and said grooves of said inwardly projecting portion for clamping the panels against said serrated sections of said outer member.

11. A housing structure for enclosing a television receiver including in combination, a unitary four-sided front structure having a frame with a channel groove in at least three sides thereof, at least three rectangular enclosing panels having edges disposed in said channel groove, corner clamping means secured to said front frame for fastening adjacent panels to one another, said clamping means each including an outer member with clamping sections overlying and contacting edge portions of two adjacent panels, said edge portions of said panels having inner grooves located opposite said clamping sections, said outer member having an extended portion disposed between said two adjacent panels, and elongated resilient inner clamping means having portions engaging said extended portion of said outer member and directly engaging said two adjacent panels in said inner grooves thereof for retaining said edge portions of the same against said clamping sections of said outer member.

12. A rectangular cabinet for enclosing a television receiver including in combination, a front frame having at least integral three sides with a channel groove therein, a plurality of enclosing panels with edges disposed in said channel groove, and clamping means securing adjacent panels to one another, said clamping means including an elongated outer member with channels therein disposed in perpendicular relation with respect to each other, edge portions of adjacent panels being disposed in said channels, one side of each of said channels having a surface for engaging an edge portion of a panel, said edge portion of said panels and the other sides of said channels having opposing grooves, and elongated retaining strips having laterally displaced resilient portions therealong and being disposed in said opposing grooves for pressing said enclosing panels against said channel surfaces, said channel surfaces and said edge portions of said panels having configurations to provide interlocking action therebetween to retain said edge portions of said panels within said channels.

13. A console cabinet for a television receiver including in combination, a unitary rectangular front frame having a top portion defining a screen viewing opening and a bottom portion providing for the emission of sound, said frame having a support groove at the top and sides thereof, top and side enclosing panels having edges disposed in said support groove, a bottom panel secured to said front frame, corner clamping means secured to said front frame for interconnecting said panels, said corner clamping means including an outer member with serrated sections overlying and contacting portions of adjacent panels and an inner clamping member in fixed relation with said outer member and engaging said panels directly opposite said serrated sections to clamp the same against said outer member, a back panel for said cabinet secured to said corner clamping means, supporting legs connected to said bottom panel of said cabinet, a supporting plate intermediate said top panel and said bottom panel for supporting television receiver components, and supporting means interconnecting said supporting plate and said support legs.

14. A console cabinet for a television receiver including in combination, an integral rectangular front frame having a top portion defining a screen viewing opening and a bottom portion providing for the emission of sound, said frame having a support groove at the top and sides thereof, top and side enclosing panels having edges disposed in said support groove, a pair of corner clamping means secured to said front frame for fastening said top panel to said side panels, said clamping means including an outer member with serrated sections overlying and contacting portions of adjacent panels and an inner clamping member in fixed relation with said outer member and engaging said panels directly opposite said serrated sections to clamp the same against said outer member, a bottom plate for said cabinet including edge portions secured to said front frame and to said side panels, a supporting plate secured to said bottom plate for supporting television receiver components, and back panel means for said cabinet secured to said corner clamping means and to said supporting plate.

15. A console cabinet for a television receiver including in combination, a unitary rectangular front structure having a top portion defining a screen viewing opening and a bottom portion providing for the emission of sound, said front structure including a frame having a support groove at the top and sides thereof, top and side enclosing panels having edges disposed in said support groove, a bottom structure secured to said front structure and to said side panels, corner clamping means for interconnecting said panels and including an outer member with clamping sections overlying and contacting portions of adjacent panels and inner clamping means, in fixed relation with said outer member and engaging said panels directly opposite said clamping sections to clamp said panels against said outer member, the engaging surfaces of said clamping sections and said panels having configurations to provide interlocking action when said panels are clamped against said clamping sections, supporting legs connected to said bottom structure of said cabinet, a supporting structure intermediate said top panel and said bottom structure for supporting television receiver components, supporting means interconnecting said supporting structure and said support legs, and a back panel for said cabinet secured to said corner clamping means and to said supporting structure.

16. A console cabinet for a television receiver including in combination, a supporting structure for supporting television receiver components, a rectangular front structure including a mask portion having a screen viewing opening and a portion providing for the emission of sound, said front structure including an integral frame having a support groove at the top and sides thereof, a top and two side enclosing panels having edges disposed in said support groove, a pair of corner clamping means secured to said frame for fastening said top panel to said side panels, said clamping means including an outer member with clamping sections overlying and contacting edge portions of adjacent panels and an inner member in fixed relation with said outer member and having clamping sections engaging said panels directly opposite said clamping sections of said outer members to clamp said panels against said outer member, said edge portions of said panels and said clamping sections of one of said inner and outer members having engaging surfaces providing interlocking action therebetween, said front structure and said side panels being connected to said supporting structure, and back panel means for said cabinet secured to said corner clamping means and to said supporting structure.

17. A housing structure for electronic apparatus including in combination, a supporting frame, a rectangular front frame secured to said supporting frame and having integral top and side portions with support grooves therein, top and side enclosing panels having edges disposed in said support grooves, said side portions including retaining means for holding panels positioned in said grooves, a pair of corner clamping means secured to said front frame for fastening said top panel to said side panels, each of said clamping means including an elongated outer member with engaging sections overlying and contacting edge portions of the adjacent panels and inner clamping means having engaging sections contacting said panels directly opposite said engaging sections of said outer member, said inner clamping means having portions concealed within the housing structure and engaging said outer member to draw said engaging sections together to clamp said edge portions of said panels therebetween, at least one of said engaging sections having an irregular locking surface contacting said panel, said supporting frame including portions secured to said side panels, and a back panel for the housing structure secured to said corner clamping means and to said supporting frame.

18. A housing structure for a television receiver including in combination, a unitary rectangular front frame defining a screen viewing opening and having top and side portions with supporting channel grooves therein, top and side enclosing panels having edges disposed in said channel grooves and supported thereby, a pair of corner clamping means secured to said front frame for fastening said top panel to said side panels, said clamping means including an elongated outer member with gripping sections overlying and contacting portions of the adjacent panels and an elongated inner clamping member in fixed relation with said outer member and engaging said panels directly opposite said gripping sections to clamp said panels thereagainst, said gripping sections of said outer member and said portions of said panels contacted thereby having configurations to provide locking action therebetween, bottom supporting means for the housing structure including edge portions secured to said front frame and to said side panels, and a back panel for said housing structure secured to said corner clamping means and to said bottom supporting means.

19. A housing structure in accordance with claim 18 wherein said clamping means includes removable means concealed within the housing structure for securing said inner clamping member in fixed relation with said outer member.

References Cited in the file of this patent

UNITED STATES PATENTS

| | | |
|---|---|---|
| 486,844 | Austin | Nov. 29, 1892 |
| 584,584 | Ganter | June 15, 1897 |
| 917,324 | Loving | Apr. 6, 1909 |
| 919,887 | Kohler | Apr. 27, 1909 |
| 926,374 | Wright | June 29, 1909 |
| 1,195,908 | Cochrane | Aug. 22, 1916 |
| 1,307,973 | Hester | June 24, 1919 |
| 1,797,925 | Plym | Mar. 24, 1931 |
| 1,868,573 | Herman | July 26, 1932 |
| 2,028,058 | Geyer | Jan. 14, 1936 |
| 2,205,826 | Small | June 25, 1940 |
| 2,673,659 | Moore | Mar. 30, 1954 |
| 2,714,625 | Gould | Aug. 2, 1955 |
| 2,765,886 | Tedaldi | Oct. 9, 1956 |
| 2,783,114 | Raduns | Feb. 26, 1957 |